(12) United States Patent
Youm

(10) Patent No.: US 9,185,378 B2
(45) Date of Patent: *Nov. 10, 2015

(54) METHOD AND APPARATUS FOR GENERATING MULTIMEDIA DATA HAVING DECODING LEVEL, AND METHOD AND APPARATUS FOR RECONSTRUCTING MULTIMEDIA DATA BY USING THE DECODING LEVEL

(71) Applicant: SAMSUNG ELECTRONICS CO., LTD., Gyeonggi-do (KR)

(72) Inventor: Sun-hee Youm, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 163 days.

This patent is subject to a terminal disclaimer.

(21) Appl. No.: 13/736,549

(22) Filed: Jan. 8, 2013

(65) Prior Publication Data

US 2013/0121663 A1 May 16, 2013

Related U.S. Application Data

(63) Continuation of application No. 12/131,445, filed on Jun. 2, 2008, now Pat. No. 8,351,351.

(30) Foreign Application Priority Data

Jul. 31, 2007 (KR) .......................... 10-2007-0077166

(51) Int. Cl.
*H04N 9/79* (2006.01)
*H04N 21/234* (2011.01)
(Continued)

(52) U.S. Cl.
CPC ........... *H04N 9/79* (2013.01); *H04N 21/23412* (2013.01); *H04N 21/234327* (2013.01);
(Continued)

(58) Field of Classification Search
CPC .................... H04N 21/23412; H04N 21/4312; H04N 21/4314; H04N 21/4316; H04N 21/234327; H04N 21/44012; H04N 9/79
USPC ........................... 370/254; 375/472; 715/202
See application file for complete search history.

(56) References Cited

U.S. PATENT DOCUMENTS 6,496,217 B1 12/2002 Piotrowski
2002/0083032 A1* 6/2002 Bourges-Sevenier ............. 707/1
(Continued)

FOREIGN PATENT DOCUMENTS

KR 10-2004-0028179 A 4/2004
KR 10-2005-0121412 A 12/2005
KR 10-2006-0066906 A 6/2006

OTHER PUBLICATIONS

Communication dated Aug. 29, 2013 issued by the Korean Intellectual Property Office in counterpart Korean Patent Application No. 10-2007-0077166.

*Primary Examiner* — Wanda Z Russell
(74) *Attorney, Agent, or Firm* — Sughrue Mion, PLLC

(57) ABSTRACT

Provided is a multimedia data generation method which includes allocating one or more pieces of image object information to each of a plurality of nodes, generating a scene tree by linking nodes according to correlation between the object information allocated to each node, and adding an event execution level attribute to each node, wherein the event execution level attribute determines whether to execute an event by using the image object information allocated to each node, thereby generating multimedia data in which the added event execution level attribute is represented with a scene description language and recorded on an area of a scene descriptor.

20 Claims, 4 Drawing Sheets

(51) Int. Cl.
*H04N 21/2343* (2011.01)
*H04N 21/431* (2011.01)
*H04N 21/44* (2011.01)

(52) U.S. Cl.
CPC ....... *H04N21/4312* (2013.01); *H04N 21/4314* (2013.01); *H04N 21/4316* (2013.01); *H04N 21/44012* (2013.01)

(56) References Cited

U.S. PATENT DOCUMENTS

2004/0030694 A1* 2/2004 Tokumo et al. .................. 707/5
2009/0295805 A1* 12/2009 Ha et al. ........................ 345/426
2012/0084839 A1* 4/2012 Ayyagari et al. ................. 726/4

* cited by examiner

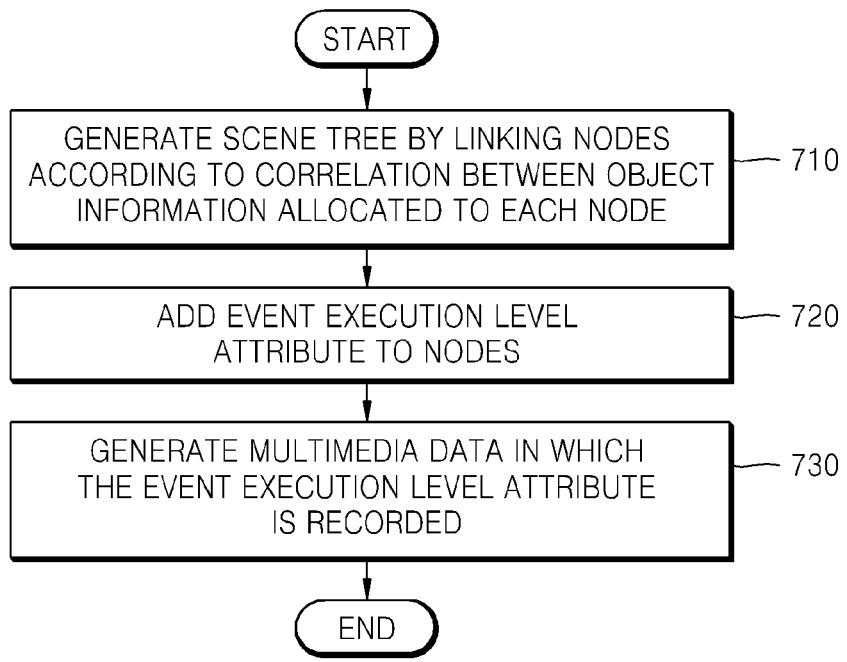
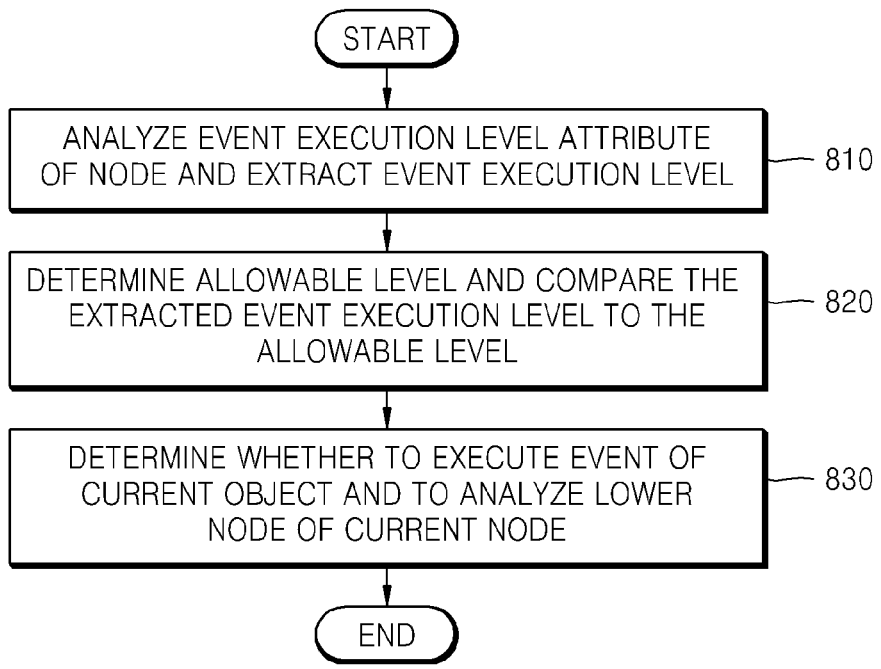

METHOD AND APPARATUS FOR GENERATING MULTIMEDIA DATA HAVING DECODING LEVEL, AND METHOD AND APPARATUS FOR RECONSTRUCTING MULTIMEDIA DATA BY USING THE DECODING LEVEL

CROSS-REFERENCE TO RELATED PATENT APPLICATION

This is a rule 53(b) Continuation of application Ser. No. 12/131,445 filed Jun. 2, 2008, which claims priority from Korean Patent Application No. 10-2007-0077166, filed on Jul. 31, 2007, in the Korean Intellectual Property Office, the disclosures of which are incorporated herein in their entireties by reference.

BACKGROUND OF THE INVENTION

1. Field of the Invention

Apparatuses and methods consistent with the present invention relate to generating multimedia data and reconstructing multimedia data, and more particularly, to generating multimedia data by differentially adding a level to an object according to a calculation processing capacity of a terminal required so as to execute an event of the object constructing an image, and reconstructing the multimedia data by determining whether to execute an event according to an object level.

2. Description of the Related Art

Since an object-based encoding/decoding method such as Moving Picture Experts Group 4 (MPEG 4) encodes objects such as images, sounds, and the like which are classified accordingly, it is possible to increase transmittance of various multimedia data, and to compress/reconstruct various forms of multimedia data with a low bit rate. Also, the object-based encoding/decoding method has substance-based bidirection by which information including the objects such as image, sounds, and the like can be edited according to necessity in a decoding procedure.

Object-oriented multimedia contents, that are multimedia data contents encoded to a plurality of object units, combine object components such as images or sounds by a link while treating the respective object components as an independent component, thereby enabling users to freely construct the images or sounds within a specific control range and reproduce the images or sounds.

Scene description information is information that enables various kinds of Audio Visual (AV) objects such as images, sounds, text, and the like to be uniformly treated. Temporal and spatial correlation between the respective objects, or attributes of the respective objects constructing a scene by the scene description information are described in the scene description information. A multimedia data format has a scene description area in which a scene description is described, and a payload area in which objects are described.

FIG. 1 illustrates examples of object-oriented multimedia 110 and a scene tree 120.

Referring to FIG. 1, the examples of the object-oriented multimedia 110 include an image or sound 112, a subtitle 114, and a related article 116, which are determined as differential objects.

The scene tree 120 indicates a link relationship such as correlation between independent objects. A node 122 corresponding to an object only having an image or sound, a node 124 corresponding to an image or sound object and a subtitle object related to the image or sound object, and a node 126 corresponding to an image or sound object, a subtitle object related to the image or sound object, and a related article object, are linked as an upper node or lower node, according to the correlation.

FIG. 2 is a diagram illustrating a scene tree 220 generated by decoding the scene tree 120 of FIG. 1, according to a conventional technology. When a scene tree analyzer decodes the scene tree 120, the scene tree 120 is decoded to a scene tree as the scene tree 220.

Object-oriented multimedia includes basic data such as the image or sound 112, as a basic level object, and additional data, such as the subtitle 114 or the related article 116, which is related to the basic data, as an enhanced level object. However, it is not possible to distinguish the basic level object from the enhanced level object in the scene tree 220 decoded using a conventional method, and thus, a terminal has to manually decode, analyze, and reproduce all available data, while equally treating each node.

However, due to scene description complexity, it is often difficult to smoothly output a decoded scene or to process a user event according to a data processing capacity or reproduction capacity of a terminal by using a conventional method of encoding/decoding a scene descriptor.

In order to separately transmit a scene descriptor according to a terminal, a description formula of the scene descriptor has to be defined in a transmission end of the scene descriptor. Thus, a protocol related to the scene descriptor is required according to a transmission medium.

Also, since distinguishing a basic profile (AV data) from an enhanced profile (additional data) in Digital Multimedia Broadcasting (DMB) is not defined in Binary Image Format for Scenes (BIFS), the basic profile and the enhanced profile cannot be pre-distinguished in a Transport Stream (TS) transmission end, thereby causing problems.

SUMMARY OF THE INVENTION

The present invention provides a method and apparatus for generating and reconstructing multimedia data while reflecting a calculation processing capability or reproduction capacity of a terminal in a receiving end, thereby increasing efficiency of exchange and decoding of object data.

According to an aspect of the present invention, there is provided a method of generating multimedia data, the method including the operations of allocating one or more pieces of image object information to each of a plurality of nodes, and generating a scene tree by linking nodes according to correlation between the image object information allocated to each node; adding an event execution level attribute to each node, wherein the event execution level attribute determines whether to execute an event by using the image object information allocated to each node; and generating multimedia data in which the added event execution level attribute is represented with a scene description language and recorded on an area of a scene descriptor.

The operation of generating the scene tree may generate a scene tree by linking an upper node corresponding to a basic object with a lower node corresponding to the basic object and one or more additional objects related to the basic object.

The operation of adding the event execution level attribute may include the operation of setting a more enhanced event execution level to the lower node than the upper node.

The operation of adding the event execution level attribute may include the operation of adding the event execution level attribute information to an uppermost node from among nodes corresponding to the objects having the same event execution level.

The method may further include the operation of fully defining the event execution level attribute added to each node by a descriptor other than the scene descriptor.

According to another aspect of the present invention, there is provided a method of reconstructing multimedia data by decoding a scene description in a scene descriptor area and an object in a payload area of the multimedia data, the method including the operations of analyzing an event execution level attribute indicating an event execution of the object corresponding to a node from among nodes in a scene tree reconstructed by translating the scene descriptor, and extracting an event execution level of the node; determining an allowable level according to a status of a receiving end, and comparing the extracted event execution level to the allowable level; and determining whether to execute an event of an object corresponding to a current node, and to analyze a lower node of the current node, according to a result of the comparison.

The operation of comparing the levels may include the operation of determining the allowable level by reflecting at least one of a data processing capability and reproduction capability of a terminal in the reception end, and an external request level.

The operation of determining whether to analyze may include the operations of executing an event related to object information of a current node and analyzing a lower node of the current node when the extracted event execution level is lower or equal to the allowable level, and proceeding to an upper node of the current node without executing the event using the object information of the current node when the extracted event execution level is higher than the allowable level.

The method may further include the operation of receiving data related to the object, when an event using the object information of the current node is executed.

The method may further include the operation of receiving and decoding data related to the object, thereby executing the event, when an event related to the object information of the current node is executed.

The operation of extracting the event execution level may include the operation of determining the event execution level by the event execution level attribute defined by a descriptor other than the scene descriptor.

According to another aspect of the present invention, there is provided a multimedia data generation apparatus including a scene tree generation unit allocating one or more pieces of image object information to each of a plurality of nodes, and generating a scene tree by linking nodes according to correlation between the object information allocated to each node; an event execution level attribute addition unit adding an event execution level attribute to each node, wherein the event execution level attribute determines whether to execute an event by using the image object information allocated to each node; and a multimedia data generation unit generating multimedia data in which the added event execution level attribute is represented with a scene description language and recorded on an area of a scene descriptor.

According to another aspect of the present invention, there is provided a multimedia data reconstruction apparatus for reconstructing multimedia data by decoding a scene description in a scene descriptor area and an object in a payload area of the multimedia data, the multimedia data reconstruction apparatus including an event execution level extraction unit analyzing an event execution level attribute of a node indicating a reproduction of the object corresponding to the node from among a plurality of nodes in a scene tree reconstructed by translating the scene descriptor, and extracting an event execution level of the node; a level comparison unit determining an allowable level according to a status of a receiving end, and comparing the extracted event execution level to the allowable level; and an analysis determination unit determining whether to execute an event of an object corresponding to a current node, and to analyze a lower node of the current node, according to a result of the comparison.

According to another aspect of the present invention, there is provided a computer readable recording medium having recorded thereon a program for executing the method of generating multimedia data.

According to another aspect of the present invention, there is provided a computer readable recording medium having recorded thereon a program for executing the method of reconstructing multimedia data.

BRIEF DESCRIPTION OF THE DRAWINGS

The above and other aspects of the present invention will become more apparent by describing in detail exemplary embodiments thereof with reference to the attached drawings in which:

FIG. 7 is a flowchart illustrating a method of generating multimedia data, according to an exemplary embodiment of the present invention; and FIG. 8 is a flowchart illustrating a method of reconstructing multimedia data, according to another exemplary embodiment of the present invention.

DETAILED DESCRIPTION OF EXEMPLARY EMBODIMENTS OF THE INVENTION

Hereinafter, a method and apparatus for generating multimedia data, and a method and apparatus for reconstructing multimedia data according to exemplary embodiments of the present invention will now be described more fully with reference to FIGS. 3 through 8.

Figure 1:
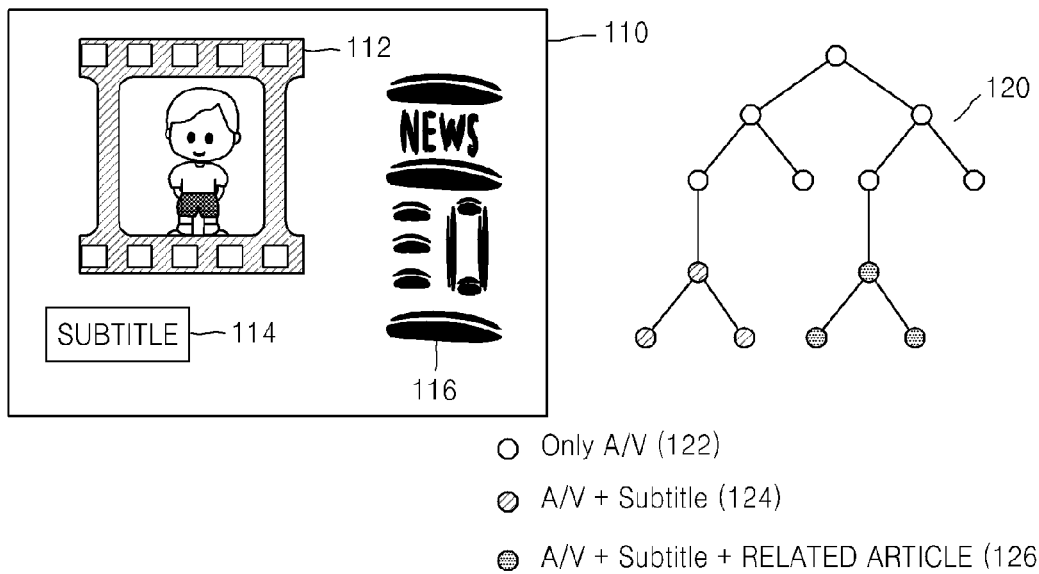
FIG. 1 illustrates examples of object-oriented multimedia and a scene tree.
Figure 2:
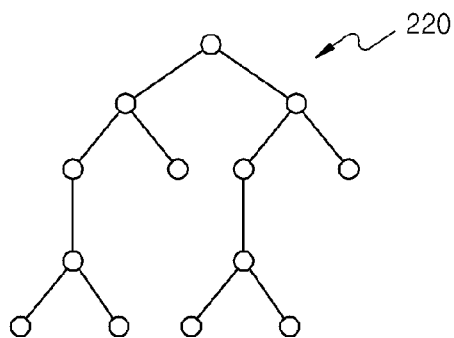
FIG. 2 is a diagram illustrating a scene tree generated by decoding the scene tree of FIG. 1, according to a conventional technology.
Figure 3:
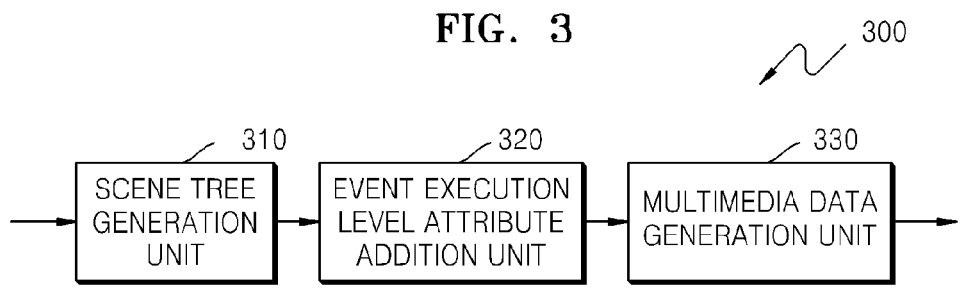
FIG. 3 is a block diagram illustrating a multimedia data generation apparatus according to an exemplary embodiment of the present invention.

FIG. 3 is a block diagram illustrating a multimedia data generation apparatus 300 according to an exemplary embodiment of the present invention.

Referring to FIG. 3, the multimedia data generation apparatus 300 according to the current exemplary embodiment of the present invention includes a scene tree generation unit 310, an event execution level attribute addition unit 320, and a multimedia data generation unit 330.

The scene tree generation unit 310 allocates one or more pieces of image object information to each of a plurality of nodes by using input multimedia data, generates a scene tree by linking nodes according to correlation between the object information allocated to each node, and outputs the generated scene tree to the event execution level attribute addition unit 320.

The scene tree generation unit 310 may generate a scene tree by linking an upper node corresponding to a basic object with a lower node corresponding to the basic object and one or more additional objects related to the basic object.

The event execution level attribute addition unit 320 receives the scene tree from the scene tree generation unit 310, adds an event execution level attribute determining whether to execute an event by using the image object information allocated to the node, and outputs the scene tree to which the event execution level attribute is added to the multimedia data generation unit 330.

The event execution level attribute addition unit 320 may set a more enhanced event execution level to the lower node than the upper node, and set event execution level attribute information to an uppermost node from among nodes corresponding to objects having the same event execution level.

The multimedia data generation unit 330 generates and outputs multimedia data in which the event execution level attribute added from the event execution level attribute addition unit 320 is represented with a scene description language and recorded on an area of a scene descriptor.

The multimedia data generation apparatus 300 may fully define the event execution level attribute added to the node in a descriptor other than the scene descriptor. For example, the multimedia data generation apparatus 300 may fully define an event execution level attribute set to a node of an object descriptor area.

Figure 4:
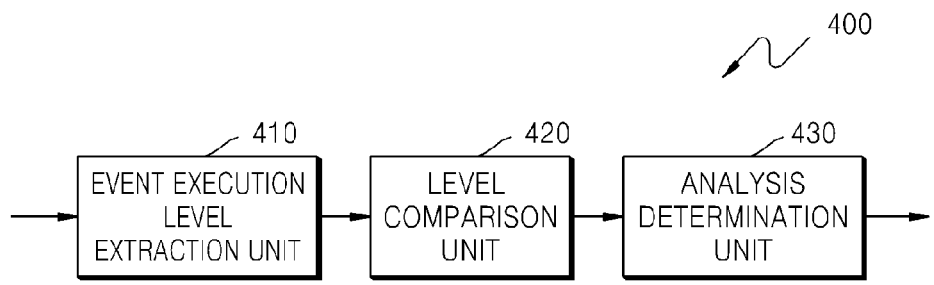
FIG. 4 is a block diagram illustrating a multimedia data reconstruction apparatus according to another exemplary embodiment of the present invention.

FIG. 4 is a block diagram illustrating a multimedia data reconstruction apparatus 400 according to another exemplary embodiment of the present invention.

Referring to FIG. 4, the multimedia data reconstruction apparatus 400 according to the current exemplary embodiment of the present invention includes an event execution level extraction unit 410, a level comparison unit 420, and an analysis determination unit 430.

The event execution level extraction unit 410 analyzes an event execution level attribute of a node indicating a reproduction of an object corresponding to a node from among a plurality of nodes in a scene tree reconstructed by translating a scene descriptor of input multimedia data, extracts an event execution level of the node, and outputs the extracted event execution level to the level comparison unit 420.

The event execution level extraction unit 410 may determine an event execution level via an event execution level attribute defined in a descriptor other than the scene descriptor. For example, an event execution level attribute defined by an object descriptor of multimedia data may be used.

The level comparison unit 420 determines an allowable level according to a status of a receiving end, compares the event execution level extracted in the event execution level extraction unit 410 to the allowable level, and outputs a result of the comparison to the analysis determination unit 430.

The level comparison unit 420 may determine the allowable level by reflecting a data processing capacity and reproduction capacity of a terminal in the receiving end, an external request level, or the like.

According to the comparison result input from the level comparison unit 420, the analysis determination unit 430 determines whether to execute an event of an object corresponding to a current node, and to analyze a node lower than the current node.

If the extracted event execution level is lower than or equal to the allowable level, the level comparison unit 420 may execute an event related to object information of the current node, and analyze the node lower than the current node. Also, if the extracted event execution level is higher than the allowable level, the event using the object information of the current node may not be executed and the node lower than the current node may not be analyzed.

In the current exemplary embodiment of the present invention, the multimedia data reconstruction apparatus 400 analyzes attribute information of a node and receives object data corresponding to a current node, and in another exemplary embodiment of the present invention, the multimedia data reconstruction apparatus 400 receives and decodes object data corresponding to a current node, thereby reproducing a corresponding object.

Figure 5:
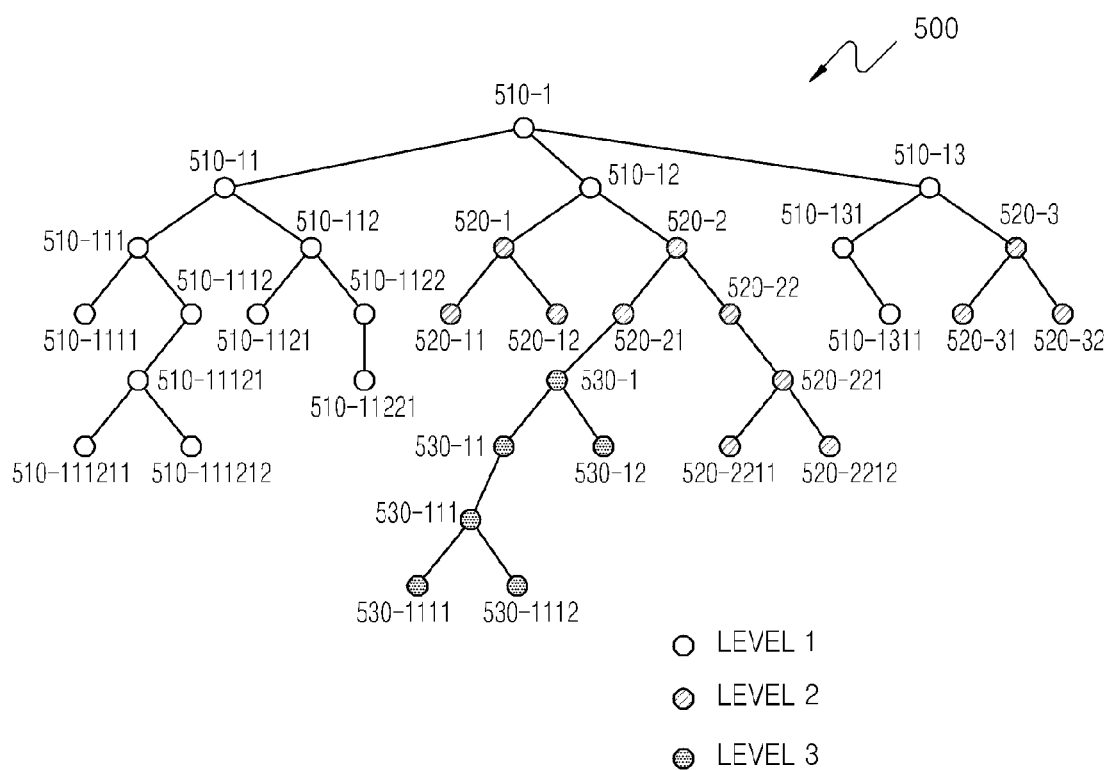
FIG. 5 is a diagram illustrating a scene tree generated according to embodiments of the present invention.

FIG. 5 is a diagram illustrating a scene tree 500 generated according to exemplary embodiments of the present invention.

Referring to FIG. 5, principles of operation related to the scene tree generation unit 310 and the event execution level attribute addition unit 320 of the multimedia data generation apparatus 300; and the event execution level extraction unit 410, the level comparison unit 420, and the analysis determination unit 430 of the multimedia data reconstruction apparatus 400 will now be described more fully.

First, a method of generating a scene tree represented by a scene descriptor recorded in the multimedia data generation apparatus 300 will now be described.

A group of nodes 510-*a*, 510-*ab*, 510-*abc*, 510-*abcd*, 510-*abcde*, and 510-*abcdef* is a group of nodes to which basic object information on image or audio data is allocated.

A group of nodes 520-*a*, 520-*ab*, 520-*abc*, and 520-*abcd* is a group of nodes to which additional object information on subtitle data related to the image or audio data is allocated.

A group of nodes 530-*a*, 530-*ab*, 530-*abc*, and 530-*abcd* is a group of nodes to which additional object information on an related article related to the image or audio data and the subtitle data is allocated.

In the scene tree generation unit 310, since a scene tree indicates a link relationship according to correlation between respective objects, nodes corresponding to the respective objects are linked according to the correlation. The scene tree 500 indicates a link relationship according to correlation between the nodes in the aforementioned three node groups.

The nodes illustrated in the scene tree 500 are sequentially linked from an upper node to a lower node according to the correlation of the respective object, and defined in order of 510-*a*, 510-*ab*, 510-*abc*, and the like from an upper node to a lower node. For example, nodes 510-11, 510-12, and 510-13 are lower nodes of a node 510-1, and nodes 520-2211 and 520-2212 are lower nodes of a node 520-221. In the respective node groups, nodes to which an additional single-digit number is added, i.e., the nodes 510-*a*, 520-*a*, and 530-*a* correspond to uppermost nodes of the respective node groups.

The event execution level attribute addition unit 320 adds an event execution level attribute to the uppermost nodes of the respective node groups, wherein the uppermost nodes are nodes 510-1, 520-1, 520-2, 520-3, and 530-1 of the scene tree 500. In the current exemplary embodiment, event execution level 1 is set to the node 510-1 of a basic object, event execution level 2 is set to the nodes 520-1, 520-2, and 520-3 of an additional object related to the basic object, and event execution level 3 is set to the node 530-1 of a lower additional object.

Hereinafter, referring to FIG. 5, a procedure for reconstructing multimedia data by interpreting a scene descriptor representing the generated scene tree 500 as described above will now be described.

In order to decode only multimedia data which satisfies a calculation processing capacity of a terminal, or a user request in a procedure for decoding multimedia data, the event execution level extraction unit 410 may analyze an event execution level attribute of a node to which an event execution level attribute is set, thereby determining an event execution level of a corresponding node group.

Thus, the event execution level extraction unit 410 extracts an event execution level from nodes to which the event execution level is set, wherein the nodes are the nodes 520-1, 520-2, and 520-3, during analysis according to a path of the scene tree 500. The event execution level extraction unit 410 extracts the event execution level 1 from the node 520-1, the event execution level 2 from the node 520-2, and the event execution level 3 from the node 520-3.

The level comparison unit 420 determines an allowable level, and compares the extracted event execution level to the allowable level. The level comparison unit 420 determines the allowable level by reflecting a data processing capacity and reproduction capacity of a terminal in a receiving end, an external request level, or the like.

The level comparison unit 420 may compare the extracted event execution level to the allowable level using an event execution level attribute defined by a descriptor other than a scene descriptor.

For example, when a current terminal has a low calculation processing capacity or a low reproduction capacity, and is therefore unable to reproduce an object including a subtitle, the allowable level is set as level 2. Also, when users do not desire reproduction of related articles, it is not necessary to process an object including the related articles, and thus, the allowable level is set as level 1.

According to a result of the comparison in the level comparison unit 420, the analysis determination unit 430 determines whether to execute an event of an object corresponding to a current node, and to analyze a lower node of the current node. If the extracted event execution level is lower than or equal to the allowable level of the receiving end, the analysis determination unit 430 executes an event related to object information of the current node, and proceeds to the lower node of the current node, according to an exemplary embodiment of the present invention.

However, if the extracted event execution level is higher than the allowable level, the analysis determination unit 430 returns to an upper node having a level lower than the extracted event execution level of the current node.

For example, when an event execution level extracted from the event execution level extraction unit 410 is level 2 while an allowable level is level 3, the analysis determination unit 430 executes an event of an object of a current node having level 2, and analyzes a lower node. However, when an event execution level extracted from the event execution level extraction unit 410 is level 2 while an allowable level is level 1, the analysis determination unit 430 returns to an upper node having event execution level 1.

The analysis determination unit 430 analyzes attribute information of a determined next node, and receives and decodes data of an object corresponding to the next node, thereby reproducing the object. Thus, it is not necessary to reproduce object data corresponding to a node that is not determined as the next node, and the object data may not be received.

Figure 6:
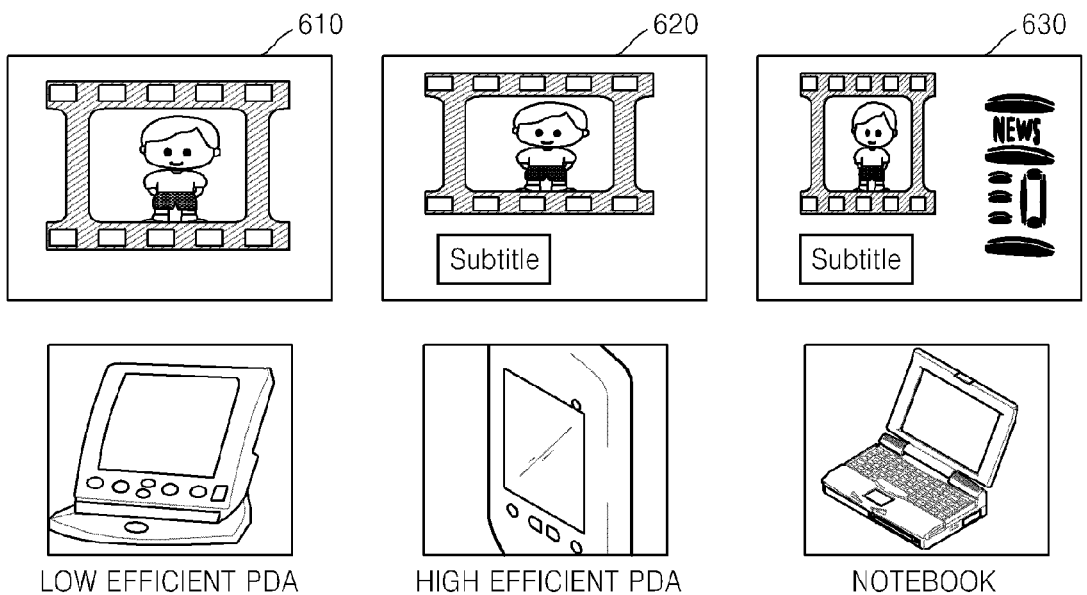
FIG. 6 is a diagram illustrating scenes in which events are executed according to allowable levels of various terminals, according to an exemplary embodiment of the present invention.

FIG. 6 is a diagram illustrating scenes in which events are executed according to allowable levels of various terminals, according to an exemplary embodiment of the present invention.

In FIG. 6, it is assumed that multimedia 610 only includes an AV object, multimedia 620 includes the AV object and a subtitle object, and multimedia 630 includes the AV object, the subtitle object, and a related article.

According to the current exemplary embodiment of the present invention, an allowable level of a terminal is determined according to a calculation processing capability or reproduction capability of the terminal. Thus, when multimedia data including basic and additional objects is received, it is not necessary to analyze attribute information of all of the multimedia data, by reproducing the attribute information of all of the multimedia data. It may be possible to receive and reproduce only object data to be reproduced, by comparing the allowable level to an extracted event execution level.

For example, in a case of an apparatus such as a low efficiency Personal Digital Assistant (PDA) having a relatively low calculation processing capability or reproduction capability, it may be possible to determine the allowable level to be level 1 that is a low level, thereby enabling the low efficiency PDA to reproduce only the multimedia 610 excluding the subtitle object and the related article object. Thus, it is not necessary to analyze a scene description corresponding to the subtitle object and the related article object, and it is not even necessary to receive and reproduce data related to the subtitle and the related article.

Likewise, the allowable level is set as level 2 in a high efficiency PDA capable of processing the subtitle object, and thus, it is not necessary to analyze, receive or reproduce attribute information on the related article data. In the case of a terminal such as a notebook having a high processing capability, the allowable level may be set to a high level, thereby enabling the terminal to reproduce not only the basic object but also all additional objects such as subtitles, related articles, and the like.

FIG. 7 is a flowchart illustrating a method of generating multimedia data, according to an exemplary embodiment of the present invention.

Referring to FIG. 7, in operation 710, one or more pieces of image object information is allocated to each of a plurality of nodes, and nodes are linked according to correlation of the object information allocated to each node, thus generating a scene tree.

In operation 720, an event execution level attribute determining whether to execute an event by using the image object information allocated to each node is added to the nodes.

In operation 730, multimedia data recorded in a scene descriptor area by representing the added event execution level attribute with a scene description language is generated.

FIG. 8 is a flowchart illustrating a method of reconstructing multimedia data, according to an exemplary embodiment of the present invention.

Referring to FIG. 8, in operation 810, an event execution level attribute of a node indicating a reproduction of an object corresponding to a node from among attribute information of nodes in a scene tree reconstructed by translating a scene descriptor is analyzed, whereby an event execution level of the corresponding node is extracted.

In operation 820, an allowable level is determined according to a status of a receiving end, and the extracted event execution level and allowable level are compared.

In operation 830, according to a result of the comparison in operation 820, it is determined whether to execute an event of an object corresponding to a current node, and to analyze a lower node of the current node.

The present invention receives, decodes, and reproduces only data of an object that is to execute a predetermined event in a terminal according to a calculation processing capability of the terminal that is to reproduce respective objects, or a user desired reproduction level, thereby decreasing calculation quantity of the terminal in a multimedia data decoding and reconstruction procedure.

Also, since a receiving end automatically determines whether to execute an event of basic and additional objects according to an allowable level, it is not necessary for a transmitting end to pre-consider the allowable level of the receiving end.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of reproducing multimedia data, the method comprising:
    determining an allowable level of a device;
    analyzing an event execution level attribute of a node, wherein the event execution level attribute indicates whether an object data assigned to the node is reproducible;
    extracting an event execution level of the node based on the analyzing; and
    when the event execution level of the node is higher than the allowable level,
    reproducing the object data assigned to the node.

2. The method of claim 1, wherein the event execution level is one of an event execution level executing objects of image, sound, subtitle and a related article, an event execution level executing any three objects among image, sound, subtitle and a related article, an event execution level executing any two objects among image, sound, subtitle and a related article, and an event execution level executing any one of objects among image, sound, subtitle and a related article.

3. The method of claim 1, wherein the event execution level attribute of the node is defined in an object descriptor of the multimedia data.

4. The method of claim 1, wherein the determining the allowable level comprises determining the allowable level based on at least one of the data processing capability of the device, a reproduction capability of the device, and an external request level.

5. The method of claim 4, wherein the allowable level is determined as equivalent to the event execution level in accordance with at least one of the data processing capability of the device, the reproduction capability of the device, and the external request level.

6. The method of claim 5, wherein the external request level is determined based on an exclusion of objects from reproducing by a user of the device.

7. The method of claim 1, wherein the event execution level stored in an event execution level attribute information.

8. A multimedia data reproducing apparatus, the apparatus comprising:
    an event execution level extractor configured to analyze an event execution level attribute of a node, indicating whether an object data assigned to the node is reproducible, and to extract an event execution level of the node based on the analyzing;
    a level comparator configured to determine an allowable level based on a device capability and compare the event execution level and the allowable level; and
    a reproducer configured to, when the event execution level of the node is higher than the allowable level, reproduce the object data assigned to the node.

9. The apparatus of claim 8, wherein the event execution level is one of an event execution level executing objects of image, sound, subtitle and a related article, an event execution level executing any three objects among image, sound, subtitle and a related article, an event execution level executing any two objects among image, sound, subtitle and a related article, and an event execution level executing any one of objects among image, sound, subtitle and a related article.

10. The apparatus of claim 8, wherein the event execution level attribute of the node is defined in an object descriptor of the multimedia data.

11. The apparatus of claim 8, wherein the level comparator determines the allowable level of the multimedia data based on at least one of a data processing capability of the device, a reproduction capability of the device, and an external request level.

12. The apparatus of claim 11, wherein the external request level is determined based on an exclusion of objects from reproducing by a user of the device.

13. A method of generating multimedia data, the method comprising:
    determining an event execution level of a node based on multimedia data reproduction capacity of the node; and
    generating the multimedia data including as a part of the multimedia data an event execution level attribute of the multimedia data indicating the event execution level.

14. The method of claim 13, wherein the determining the event execution level of the node is performed based on the number of multimedia objects to be added.

15. The method of claim 14, wherein the multimedia objects comprises at least one of image, sound, and subtitle and a related article.

16. The method of claim 13, wherein the event execution level attribute is defined in an object descriptor of the multimedia data.

17. An apparatus for generating multimedia data, the apparatus comprising:
    an event execution level attribute adder configured to determine an event execution level of a node based on multimedia data reproduction capacity of the node; and
    generate the multimedia data including as a part of the multimedia data an event execution level attribute of the multimedia data indicating the event execution level.

18. The apparatus of claim 17, wherein the event execution level of the node is determined based on the number of multimedia objects to be added.

19. The apparatus of claim 18, wherein the multimedia objects comprises at least one of image, sound, subtitle and a related article.

20. The apparatus of claim 17, wherein the event execution level attribute is defined in an object descriptor of the multimedia data.

* * * * *